US011290188B2

(12) United States Patent
Watté et al.

(10) Patent No.: US 11,290,188 B2
(45) Date of Patent: Mar. 29, 2022

(54) FIBER OPTICAL COMMUNICATION SYSTEM USING ASYMMETRIC OPTICAL WAVEGUIDE SPLITTER

(71) Applicant: COMMSCOPE TECHNOLOGIES LLC, Hickory, NC (US)

(72) Inventors: Jan Watté, Grimbergen (BE); Salvatore Tuccio, Kessel-Lo (BE); Vivek Panapakkam Venkatesan, Leuven (BE); Saurav Kumar, Kessel-Lo (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/260,898

(22) PCT Filed: Jul. 17, 2019

(86) PCT No.: PCT/US2019/042188
§ 371 (c)(1),
(2) Date: Jan. 15, 2021

(87) PCT Pub. No.: WO2020/018657
PCT Pub. Date: Jan. 23, 2020

(65) Prior Publication Data
US 2021/0258077 A1    Aug. 19, 2021

Related U.S. Application Data

(60) Provisional application No. 62/699,480, filed on Jul. 17, 2018.

(51) Int. Cl.
*H04B 10/25* (2013.01)
*G02F 1/313* (2006.01)
(Continued)

(52) U.S. Cl.
CPC ..... *H04B 10/25891* (2020.05); *G02F 1/3132* (2013.01); *H04B 10/503* (2013.01); *H04B 10/80* (2013.01)

(58) Field of Classification Search
CPC ............ H04B 10/25891; H04B 10/503; H04B 10/80; G02F 1/3132
(Continued)

(56) References Cited

U.S. PATENT DOCUMENTS 5,896,476 A * 4/1999 Wisseman ........... G02B 6/2861
385/37
7,142,748 B1 * 11/2006 Yang ........................ G02B 6/30
385/30
(Continued)

FOREIGN PATENT DOCUMENTS

JP    2004-037769 A    2/2004
WO    2009/111029 A2    9/2009

OTHER PUBLICATIONS

International Search Report and Written Opinion of the International Searching Authority for International Patent Application No. PCT/US2019/042188 dated Nov. 12, 2019, 8 pages.
(Continued)

*Primary Examiner* — Abbas H Alagheband
(74) *Attorney, Agent, or Firm* — Merchant & Gould

(57) ABSTRACT

An optical communications system includes a laser transmitter to generate an optical signal and a first optical fiber network coupled to transmit the optical signal from the laser transmitter system. A first latchable, asymmetric coupler is disposed along the first optical fiber network to receive the optical signal, and has a first tap output that receives a selected and alterable first fraction of the optical signal. A second latchable, asymmetric coupler is disposed along the first optical fiber network to receive the optical signal from the first latchable asymmetric coupler and has a second tap
(Continued)

output that receives a selected and alterable second fraction of the optical signal incident at the second latchable. In certain embodiments the first and second couplers are capable of operating at any of at least three tapping fractions.

20 Claims, 15 Drawing Sheets

(51) Int. Cl.
    *H04B 10/50*     (2013.01)
    *H04B 10/80*     (2013.01)

(58) Field of Classification Search
    USPC .......................................................... 398/141
    See application file for complete search history.

(56) References Cited

U.S. PATENT DOCUMENTS

| | | | | |
|---:|---|---|---|---|
| 9,588,395 | B2* | 3/2017 | Jewart | G02F 1/2257 |
| 10,330,863 | B2* | 6/2019 | Ticknor | G02B 6/125 |
| 10,605,991 | B2* | 3/2020 | Karimelahi | G02B 6/29344 |
| 2002/0018507 | A1* | 2/2002 | Deacon | H01S 5/141 |
| | | | | 372/96 |
| 2006/0093369 | A1* | 5/2006 | Nagarajan | H04B 10/43 |
| | | | | 398/135 |
| 2013/0343765 | A1* | 12/2013 | Rohde | H04B 10/2589 |
| | | | | 398/139 |
| 2016/0085136 | A1* | 3/2016 | Reuven | G02F 1/313 |
| | | | | 385/41 |

OTHER PUBLICATIONS

Adar, R. et al., "Adiabatic 3-dB Couplers, Filters, and Multiplexers Made with Silica Waveguides on Silicon", Journal of Lightwave Technology, 10(1): 46-50 (Jan. 1992).
Ashraf, M. et al., "Micro Electromechanical Systems (MEMS) Based Microfluidic Devices for Biomedical Applications", Int. J. Mol. Sci., 12: 3648-3704 (2011).
Chen, W. et al., "Broadband directional couplers fabricated in bulk glass with high repetition rate femtosecond laser pulses". Optics Express, 16(15): 1-11 (Jul. 2008).
Livermore, C., "Design choices: MEMS actuators", Massachusetts Institute of Technology, course material for 6.777J/2.372J Design and Fabrication of Microelectromechanical Devices, 1-50 (Spring 2007).
Munas, F.R. et al., "Review on MEMS based Micropumps for Biomedical Applications", Int. J. Innovative Research in Science, Engineering and Technology, 4(7): 5602-5615 (Jul. 2015).
Seek, T. et al., "50x50 Digital Silicon Photonic Switches with MEMS-Actuated Adiabatic Couplers", Optical Society of America, 1-3 (2015).
Seek, T. et al., "Large-scale broadband digital silicon photonic switches with vertical adiabatic couplers", Optica, 3(1): 64-70 (Jan. 2016).
Takagi, A. et al., "Broadband Silica-Based Optical Waveguide Coupler with Asymmetric Structure", Electronics Letters, 26(2): 132-133 (Jan. 1990).
Takagi, A. et al., "Silica-Based Waveguide-Type Wavelength-Insensitive Couplers (WINC's) with Serier-Tapered Coupling Structure", Journal of Lightwave Technology, 10(12): 1814-1824 (Dec. 1992).
Zhang, W. et al., "Stability, Nonlinearity and Reliability of Electrostatically Actuated MEMS Devices", Sensors, 7: 760-796 (2007).
"An Introduction to MEMS (Micro-electromechanical Systems)", PRIME Faraday Partnership, 1-56 (Jan. 2002).
Technical Specifcations: For Single-Mode, Wavelength Independent, Fused Biconical Tapered Fiber-Optic Splitters, CommScope, 1-17 (May 2016).
MORPHIC: Mems-based zerO-power Reconfigurable PHotonic ICs, Research and Innovation Actions, 1-70 (2017).
MORPHIC: Mems-based zerO-power Reconfigurable PHotonic ICs, Research and Innovation Actions, 1-22 (2017).
Narevich et al., "Ultra-Wide-Band Adiabatic Coupler as a Building Block for 2x32 PLC Splitter," IEEE Conference on Optical Fiber Communication OFC Collocated National Fiber Optic Engineers, San Diego, CA, 3 pages (2008).

* cited by examiner

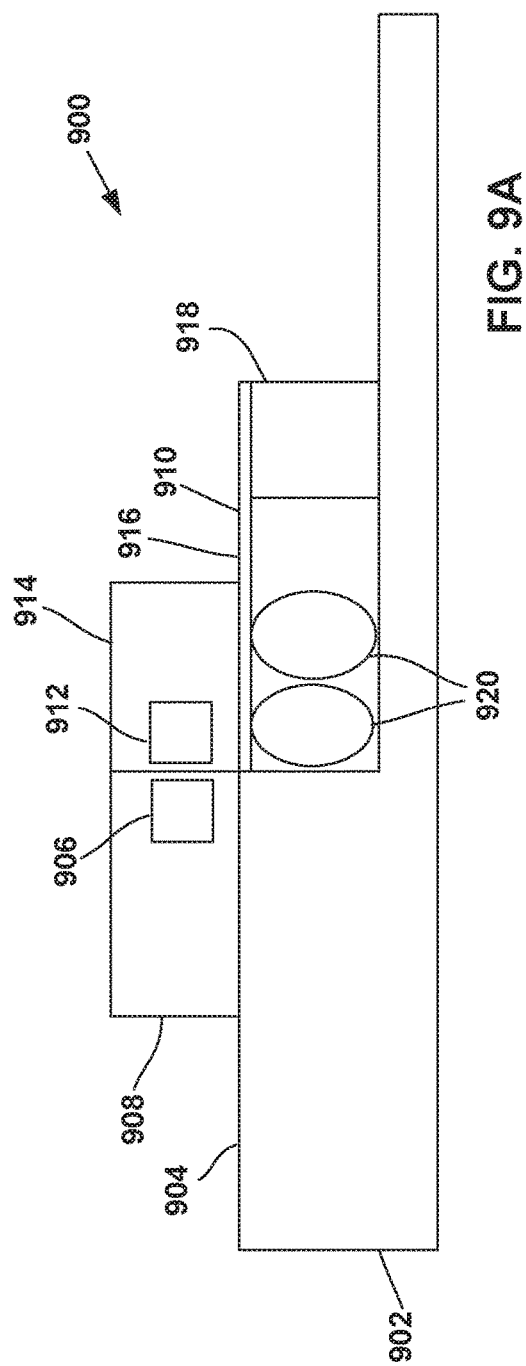
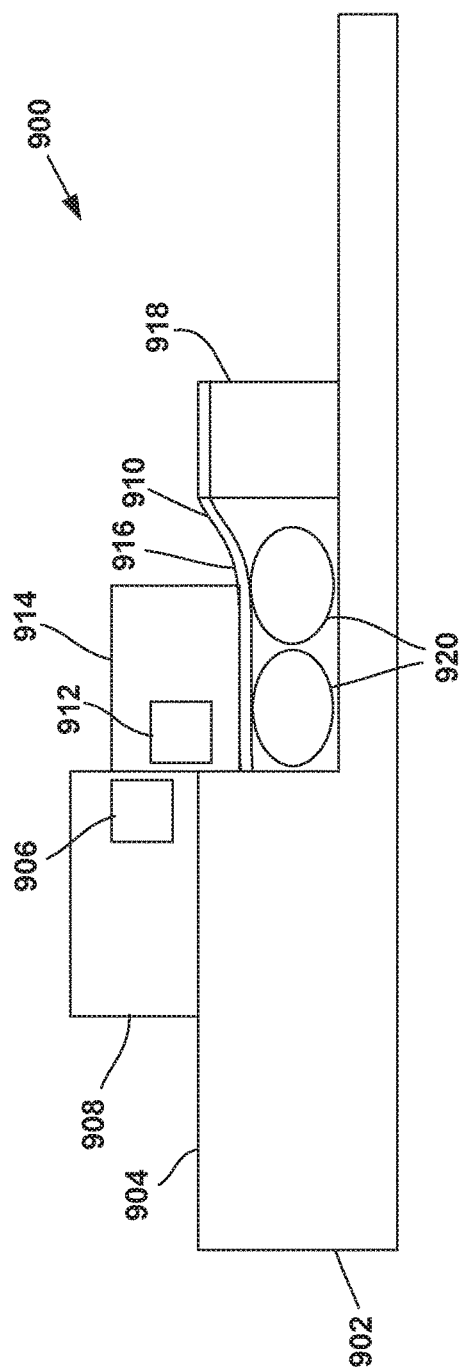

FIBER OPTICAL COMMUNICATION SYSTEM USING ASYMMETRIC OPTICAL WAVEGUIDE SPLITTER

CROSS-REFERENCE TO RELATED APPLICATION

This application is a National Stage Application of PCT/US2019/042188, filed on Jul. 17, 2019, which claims the benefit of U.S. Patent Application Ser. No. 62/699,480, filed on Jul. 17, 2018, the disclosures of which are incorporated herein by reference in their entireties. To the extent appropriate, a claim of priority is made to each of the above disclosed applications.

FIELD OF THE INVENTION

The present invention is generally directed to optical communications, and more specifically to optical splitters used for splitting a signal from a trunk fiber to a user.

BACKGROUND OF THE INVENTION

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates one embodiment of a network 100 deploying fiber optic lines. In the illustrated embodiment, the network 100 can include a central office 101 that connects a number of end subscribers 105 (also called end users 105 herein) in a network. The central office 101 can additionally connect to a larger network such as the Internet (not shown) and a public switched telephone network (PSTN). The network 100 can also include fiber distribution hubs (FDHs) 103 that distribute signals to the end users 105. The various lines of the network 100 can be aerial or housed within underground conduits. The portion of the network 100 that is closest to central office 101 is generally referred to as the F1 region, where F1 is the "feeder fiber" from the central office 101. The portion of the network 100 closest to the end users 105 can be referred to as an F2 portion of network 100. The network 100 includes a plurality of break-out locations 102 at which branch cables are separated out from the main cable lines. Branch cables are often of the fibers of the branch cables to a plurality of different subscriber locations 105.

An incoming signal is received from the central office 101, and is then typically split at the FDH 103, using one or more optical splitters (e.g., 1×8 splitters, 1×16 splitters, or 1×32 splitters) to generate different user signals that are directed to the individual end users 105. In typical applications, an optical splitter is provided prepackaged in an optical splitter module housing and provided with a splitter output in pigtails that extend from the module. The optical splitter module provides protective packaging for the optical splitter components in the housing and thus provides for easy handling for otherwise fragile splitter components. This modular approach allows optical splitter modules to be added incrementally to FDHs 103 as required.

It is desirable, however, to apportion the optical power output from the central office 101 equally among all users, which means that the optical splitter modules located closer to the central office 101 split off a smaller fraction of the incoming optical signal because the optical signal is strong, while optical splitter modules located further from the central office 101 split off a greater fraction of the incoming optical signal. The fraction of the optical signal split off from the main optical signal is referred to as the tapping fraction. For example, as shown in FIG. 2, a central office 202, that includes a laser transmitter system 202a and laser receiver system 202b, distributes an optical signal to four users 204 in an optical network 206 via serially arranged asymmetric splitter modules 208. The laser transmitter system 202a may include one or more lasers producing optical signals at different wavelengths, which are multiplexed together, for example via wavelength division multiplexing (WDM) for transmission along the optical network 206. Similarly, the laser receiver system 202b may include one or more optical detectors that receive optical signals at different wavelengths. For example, after receiving a WDM optical signal from the optical network 206, the laser receiver system 202b may demultiplex the WDM signal and detect the optical signals at different wavelengths separately from each other.

To achieve an equal distribution of optical power among the four users 204, the optical splitter modules 208a, 208b, 208c respectively split off ¼, ⅓ and ½ of the incident optical power. In other words, the tapping fractions of the splitter modules 208a, 208b and 208c are respectively ¼, ⅓ and ½. The optical splitter modules 208 each split off a fixed fraction of the incident optical power. Thus, the technician installing the optical splitter modules must be supplied with a variety of optical splitter modules, that split off different module is to be located. Furthermore, the larger the number of optical splitter modules placed serially along the network, the greater the number of different splitter modules need to be carried in inventory.

There is a need, therefore, to reduce the numbers of types of optical splitter modules required to be carried in inventory.

SUMMARY OF THE INVENTION

In broad terms, the present invention is directed to an optical splitter module whose splitting faction can be adjusted in the field, and thereafter remains persistent. In this manner, the technician can carry just one type of optical splitter module, and adjust the splitting fraction in situ to the desired level.

One embodiment of the invention is directed to an optical system that includes a laser transmitter system to generate an optical signal and a first optical fiber network coupled to transmit the optical signal from the laser transmitter system. A first latchable, asymmetric coupler is disposed along the first optical fiber network to receive the optical signal, and is configured and arranged with a first tap output that receives a selected and alterable first fraction of the optical signal incident at the first latchable, asymmetric coupler. A second latchable, asymmetric coupler is disposed along the first optical fiber network to receive the optical signal from the first latchable asymmetric coupler. The second latchable, asymmetric coupler is configured and arranged with a second tap output that receives a selected and alterable second fraction of the optical signal incident at the second latchable, asymmetric coupler, the second fraction being different from the first fraction.

Another embodiment of the invention is directed to an optical system that includes a laser transmitter system to generate an optical signal and a first optical fiber network coupled to transmit the optical signal from the laser transmitter system. A first latchable, asymmetric coupler is disposed along the first optical fiber network to receive the optical signal, the first latchable, asymmetric coupler capable of operating at any of at least three different tapping fractions. A second latchable, asymmetric coupler is disposed along the first optical fiber network to receive the optical signal from the first latchable asymmetric coupler. The second latchable, asymmetric coupler is capable of operating at any of at least three different tapping fractions. illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 9A and 9B schematically illustrate an embodiment of a latchable asymmetric adjustable waveguide splitter having a cantilevered translation mechanism, according to an embodiment of the present invention;

Figure 1:
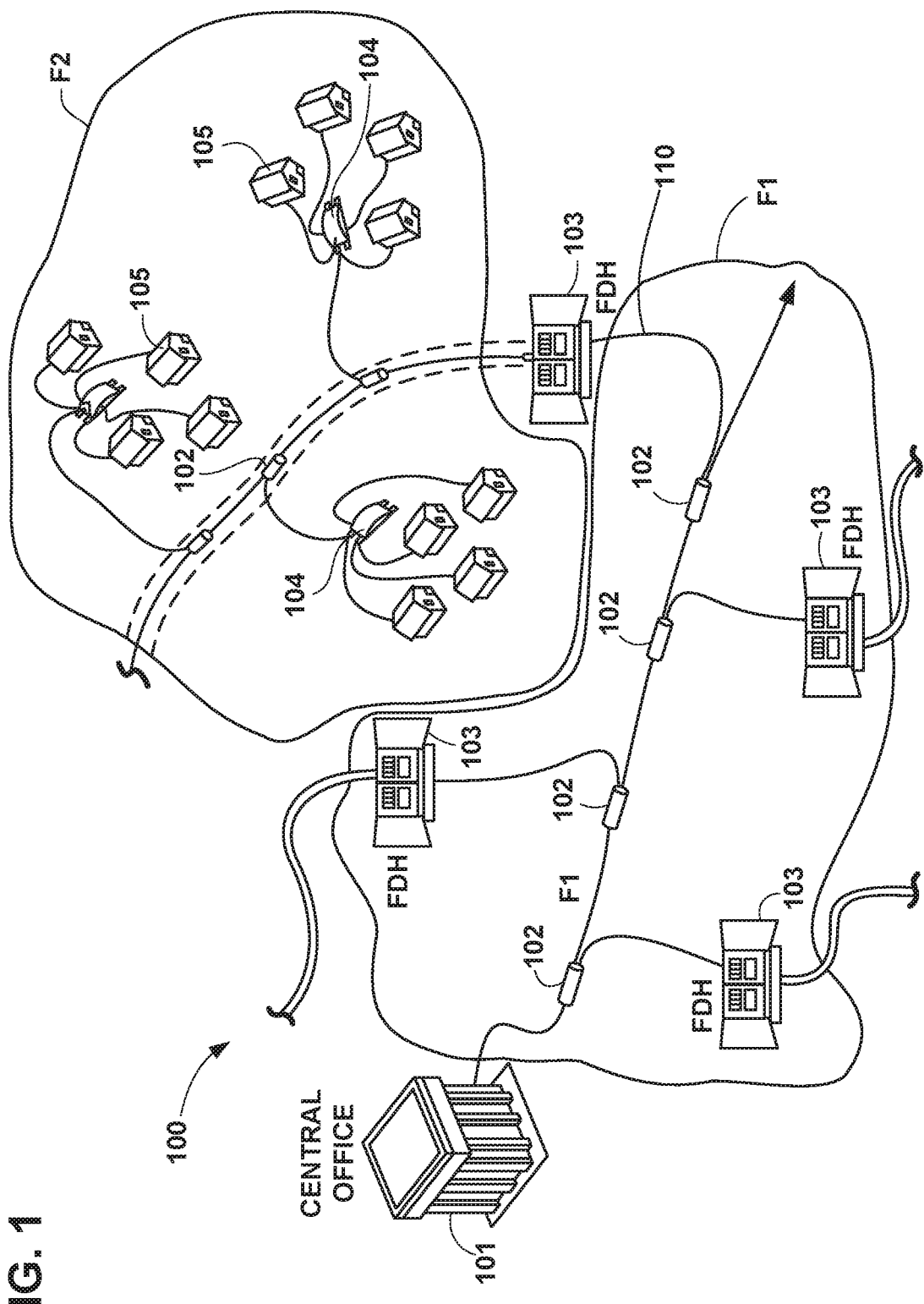
FIG. 1 schematically illustrates various elements of an optical data distribution and communication network.
Figure 2:
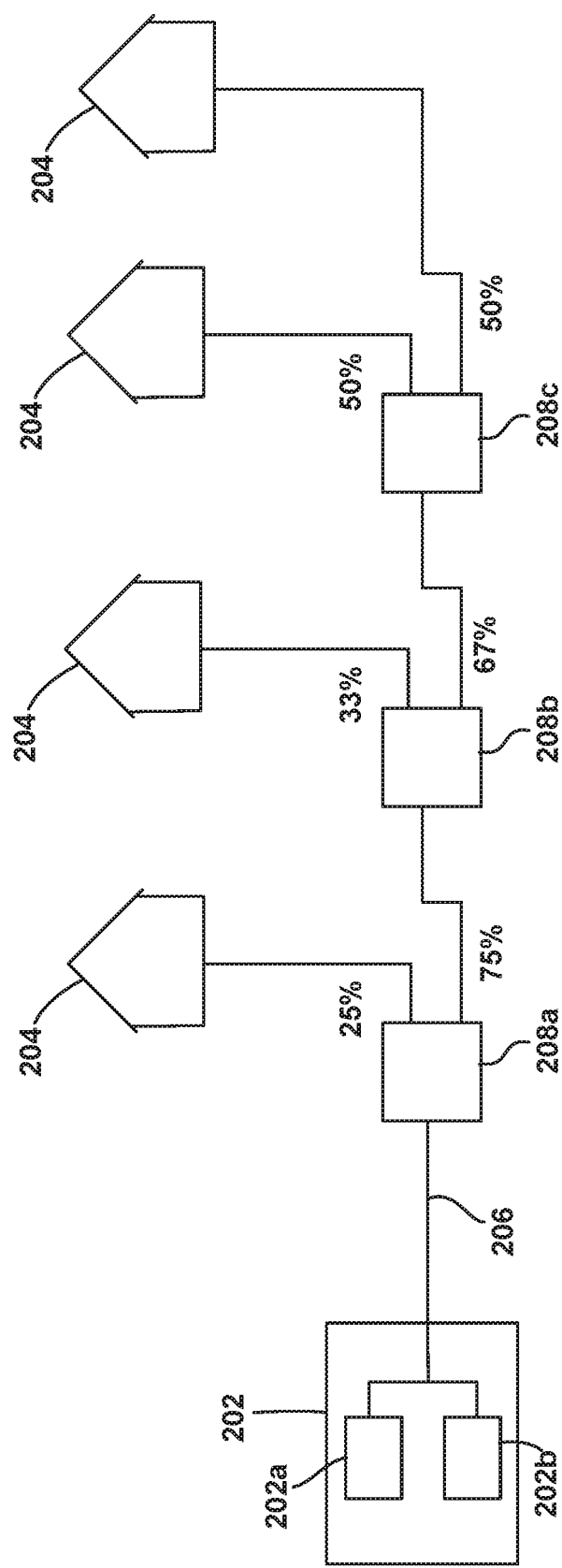
FIG. 2 schematically illustrates a simple, serial optical network having four users and the different optical splitter modules required to provide optical signals of equal magnitude to each user.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

The present invention is directed to providing an asymmetric splitter than has a tunable splitting ratio that latches to a desired value for sustained operation with a selected tap ratio.

Figure 3:
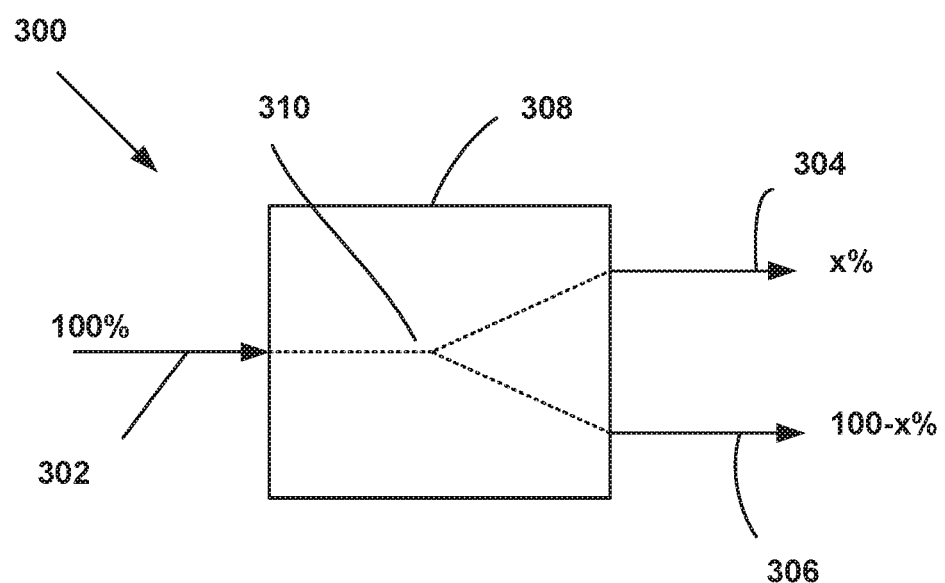
FIG. 3 schematically illustrates an embodiment of a latchable, asymmetric adjustable waveguide splitter, according to an embodiment of the present invention.

FIG. 3 schematically illustrates an embodiment of a latchable, asymmetric splitter module 300. It has an input 302, a tap output 304 and a main output 306. The tap output 304 constitutes the output that is directed off the main trunk, e.g. to one or more users, while the main output 306 is the output along the main trunk to the next splitter module. Each of the input, 302, the tap output 304 and the main output 306 may be provided as fiber pigtails. Within the housing 308 of the splitter module 300, is a splitter network 310, which directs a portion (x %) of the light entering the splitter module 300 via in the input 302 to the tap output 304, with the remaining light (100-x %) passing to the main output 306. The tapping fraction, i.e. that fraction of incoming light directed to the tap output 304 by the splitter, x %, is adjustable so that the power split ratio can be configured to a desired value. In some embodiments, the splitter module 300 includes an active embedded controller that, via a configuration tool used by a technician, adjusts the tapping fraction. Once the tapping fraction has been set, the tapping fraction may remain latched at the desired value until it is reset. This way, the splitter module 300 can remain at a specific tapping ratio until the optical network is changed, e.g. via the addition of customers, in which case the splitter ratio can be changed to accommodate the updates to the network. In certain embodiments, the splitter module can operate at any one of three or more tapping fractions, in other embodiments at any one of five or more tapping fractions, and in other embodiments, any one of seven or more tapping fractions.

Figure 4A:
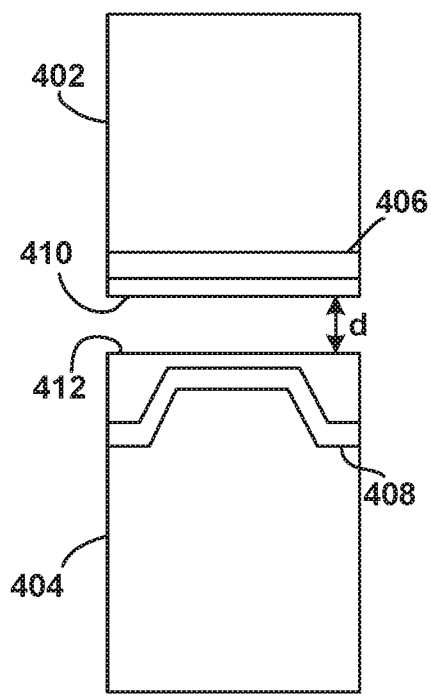
FIGS. 4A-4B schematically illustrate an embodiment of a latchable, asymmetric adjustable waveguide splitter in a first configuration, according to an embodiment of the present invention.
Figure 4C:
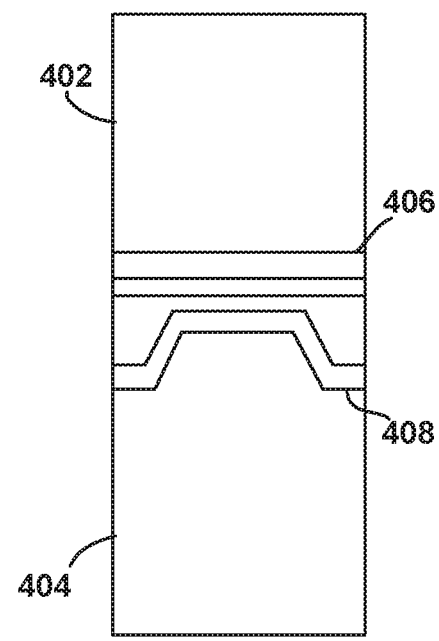
FIGS. 4C-4D schematically illustrate an embodiment of a latchable, asymmetric adjustable waveguide splitter in a second configuration, according to an embodiment of the present invention.
Figure 4B:
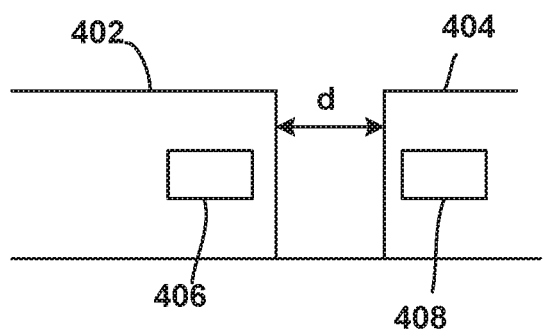
Figure 4D:
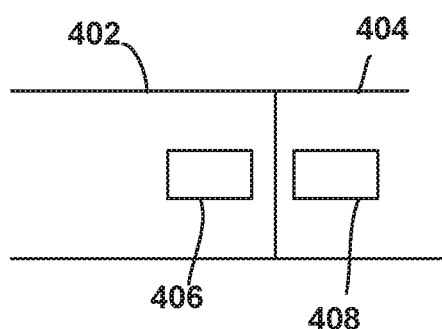

FIGS. 4A-4D schematically illustrate one approach to providing a latchable, asymmetric splitter module 400. The splitter module 400 includes a first substrate 402 and a second substrate 404. The first and second substrates 402, 404 are arranged so as to permit relative motion of one or other of the substrates 402, 404. The first substrate 402 includes a first waveguide 406 and the second substrate includes a second waveguide 408. The first waveguide 406 and the second waveguide 408 are arranged such that, under specific circumstances discussed below, light may couple from the first waveguide 406 to the second waveguide 408. In the illustrated embodiment, at least a portion of the first waveguide 406 is located close to the first edge 410 of the first substrate 402. Likewise, at least a portion of the second waveguide 408 is located close to the first edge 412 of the second substrate 404.

separated by a distance δ. FIG. 4B shows the same view in cross-section. FIG. 4C schematically illustrates a plan view when the two substrates are not separated but, instead, their first edges 410, 412 are in contact, in other words, when δ=0. FIG. 4D shows the cross-sectional view when δ=0.

The amount of light coupled between the first and second waveguides 402, 404 is dependent, inter alia, on the separation between the waveguides 402, 404. Accordingly, changing the separation distance, δ, between the waveguides 402, 404, results in a change in the amount of light coupled from the first waveguide 402 to the second waveguide 404. Thus, by selecting a specific value of δ, the amount of light coupled from the first waveguide 402 to the second waveguide 404 in the latchable, asymmetric coupler can be set to a desired value.

The waveguides 402, 404 may be formed using any suitable type of waveguide technology, including, for example, silicon, silicon nitride and silicon dioxide-based waveguides.

Figure 4E:
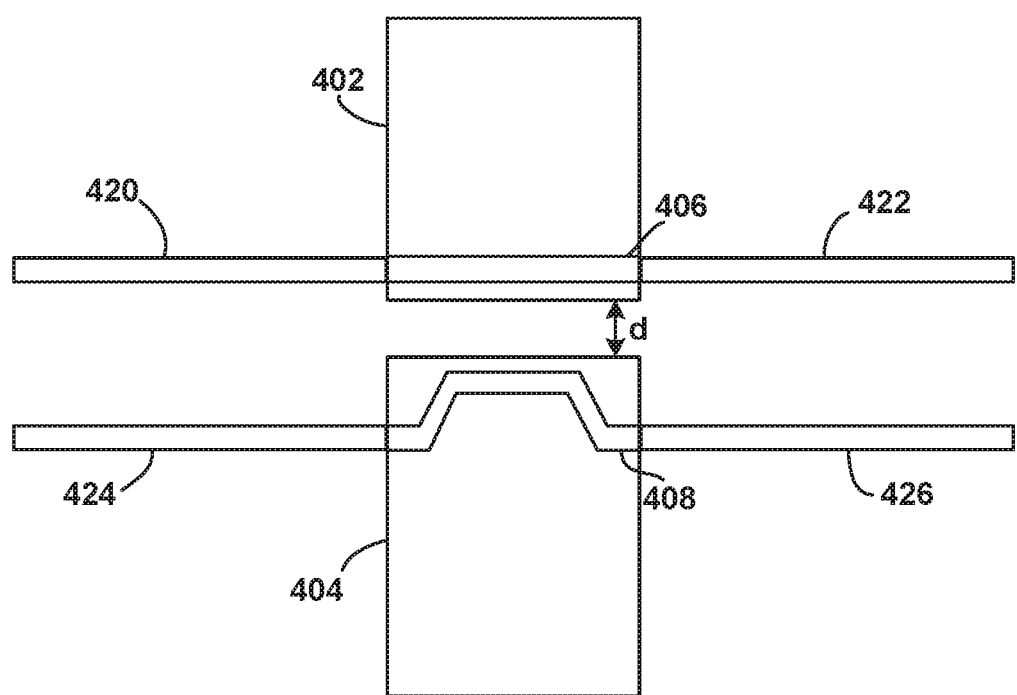
FIG. 4E schematically illustrates an embodiment of a latchable, asymmetric adjustable waveguide splitter with optical fiber input and outputs, according to an embodiment of the present invention.

Light may be directed into and out of the waveguides 406, 408 using optical fibers attached to their respective substrates. For example, in the embodiment illustrated in FIG. 4E, the first substrate 402 has a first input fiber 420 and a first output fiber 422, while the second substrate 404 has a second input fiber 424 and a second output fiber 426. In some embodiments, the second input fiber 424 may be omitted. The input and output fibers 420, 422, 424, 426 may be attached to their respective substrates via standard techniques, e.g., via a v-groove aligner block or the like.

Figure 5A:
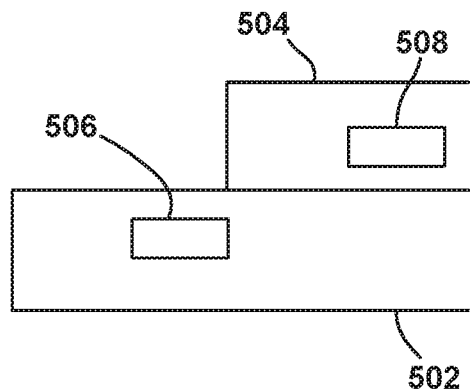
FIGS. 5A and 5B schematically illustrate a latchable, asymmetric adjustable waveguide splitter, according to another embodiment of the present invention.
Figure 5B:
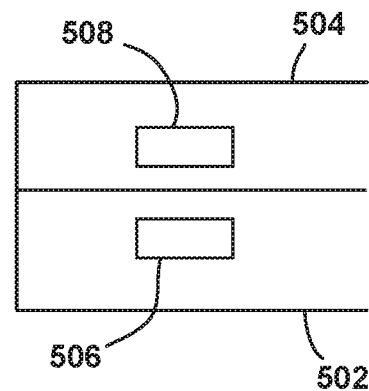

The substrates carrying the waveguides may be translated in different ways so as to effect a change in the optical coupling between waveguides. The approach shown in FIGS. 4A-4E can be described as a lateral translation to affect lateral coupling, i.e. the lateral direction of the motion of the substrates is parallel to the lateral direction of the coupling of light from one waveguide to the other. For example, the substrates may be arranged for vertical light coupling from one waveguide to the other, while there is lateral relative motion between the substrates. For example, in the embodiment schematically illustrated in FIGS. 5A and 5B, the first substrate 502 substrate is positioned below the second substrate 504. In FIG. 5A, the second waveguide 508 in the second substrate 504 is not positioned vertically above the first waveguide 506 in the first substrate 502 but is, instead, positioned to the side of the vertical position. In such a position there relatively weak, or even zero, optical coupling between the waveguides 506, 508. FIG. 5B shows relatively strong optical coupling between the waveguides 506, 508.

Figure 6A:
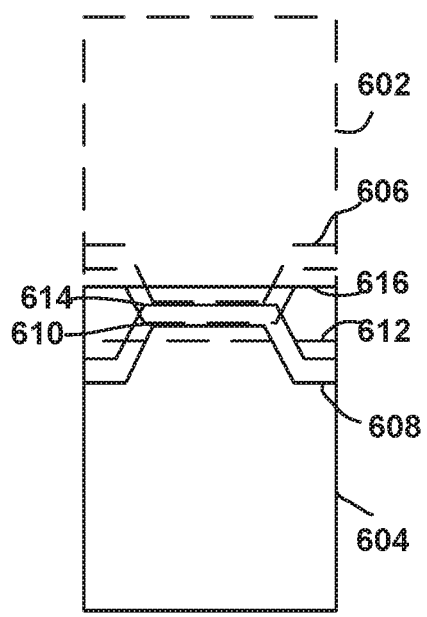
FIGS. 6A and 6B schematically illustrate a latchable, asymmetric adjustable waveguide splitter, according to another embodiment of the present invention.
Figure 6B:
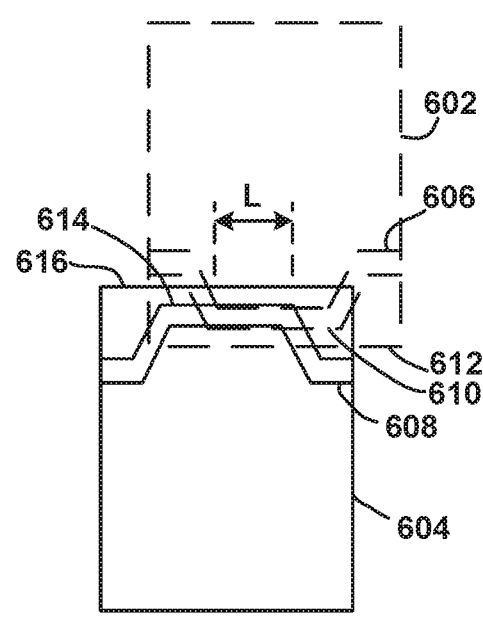

Another approach to changing the amount of optical coupling by across the waveguides is to translate one of the substrates in a direction parallel to the waveguide. An embodiment that follows this approach is schematically illustrated in FIGS. 6A and 6B. The first substrate 602 contains the first waveguide 606 and the second substrate contains a second waveguide 608. The second substrate 604 is located above the first substrate 602, hence the first substrate 602 and first waveguide 606 are shown in dashed lines, while the second substrate 604 and second waveguide 608 are shown in solid lines. In this embodiment, the first waveguide 602 includes a coupling section 610 that lies closer to the edge 612 of the first substrate 602 than the remainder of the first waveguide 606. Likewise, the second waveguide 608 includes a coupling section 614 that lies closer to the edge 616 of the second substrate 604 than the remainder of the second waveguide 608.

FIG. 6A shows the first and second substrates 602, 604 positioned to maximize the overlap between the coupling sections 610, 614 of the first and second waveguides 606, 608. This position corresponds to a relatively high level of optical coupling between the first and second waveguides 606, 608. FIG. 6B shows the second substrate 604 displaced in a direction parallel to the second coupling section 614, so that first coupling section 610 overlaps with the second coupling section 614 over a shorter length, L, than in FIG. 6A. This position corresponds to a relatively smaller level of optical coupling between the waveguides 606, 608.

Figure 7A:
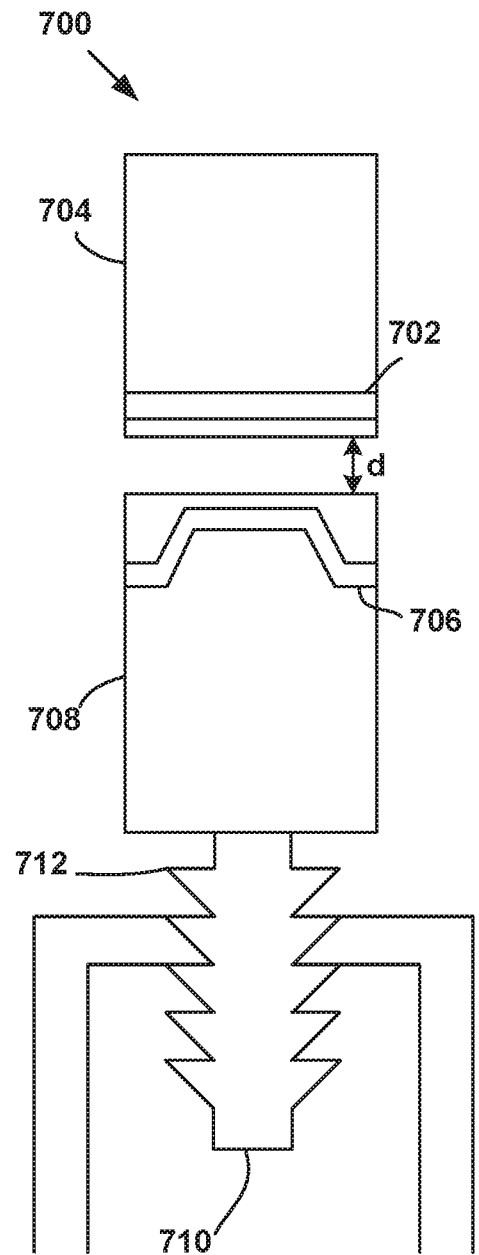
FIGS. 7A and 7B schematically illustrate an embodiment of a latchable asymmetric adjustable waveguide splitter having a ratcheted translation mechanism, according to an embodiment of the present invention.
Figure 7B:
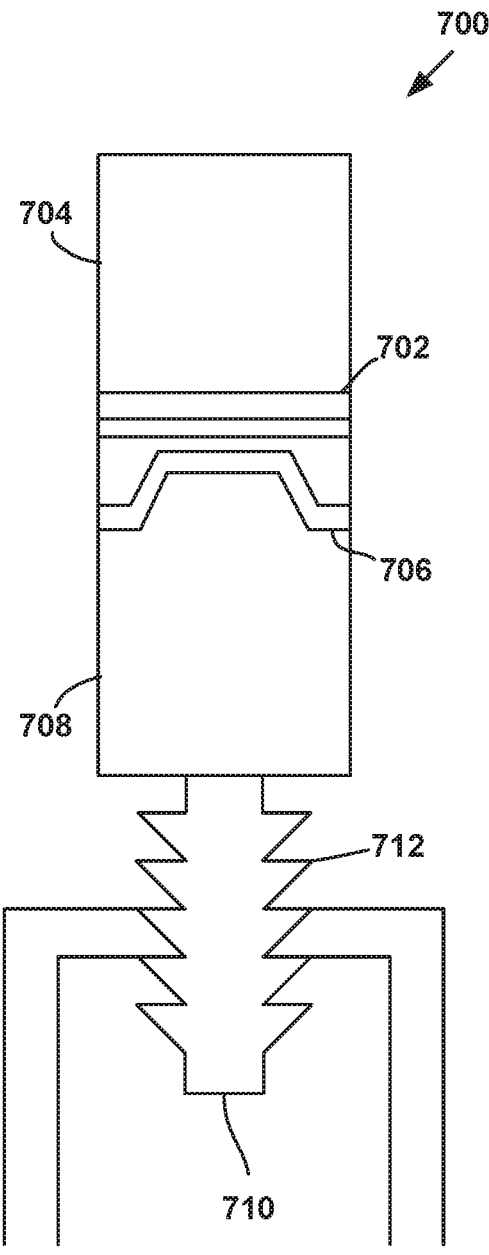

Another embodiment of part of a latchable, asymmetric splitter unit 700 is schematically, that uses microelectromechanical system (MEMS) technology is illustrated in FIGS. 7A and 7B. The splitter unit 700 includes a first waveguide 702 mounted on a substrate 704 and a second waveguide 706 mounted on a movable substrate 708. The movable substrate 708 is movable in a direction transverse to the waveguides 702, 706. The movable substrate 708 is connected to a ratchet element 710 provided with a set of ratchet teeth 712. Engaging elements 714, selectively engage the ratchet teeth 712, both to permit the movable substrate 708 to slide in the direction shown by the double headed arrow, thus affecting the optical coupling between the first and second waveguides 702, 706, and to fix the movable substrate 708 at a desired position associated with the desired amount of optical coupling between the waveguides 702,706. Optical fibers are not shown attached to the first and second waveguides 702, 706. In the embodiment illustrated in FIG. 7A, the gap between the waveguides 702, 706 is large, corresponding to reduced gap between the waveguides 702, 706 is reduced, corresponding to increased coupling between the waveguides 702, 706.

Figure 7C:
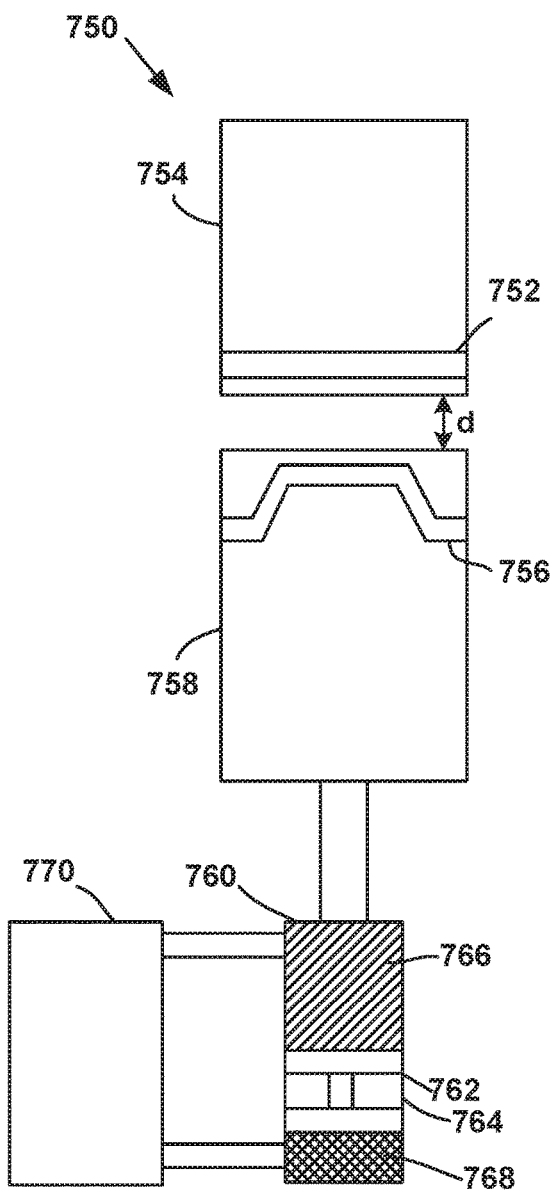
FIGS. 7C and 7D schematically illustrate an embodiment of a latchable asymmetric adjustable waveguide splitter having a hydraulic translation mechanism, according to an embodiment of the present invention.
Figure 7D:
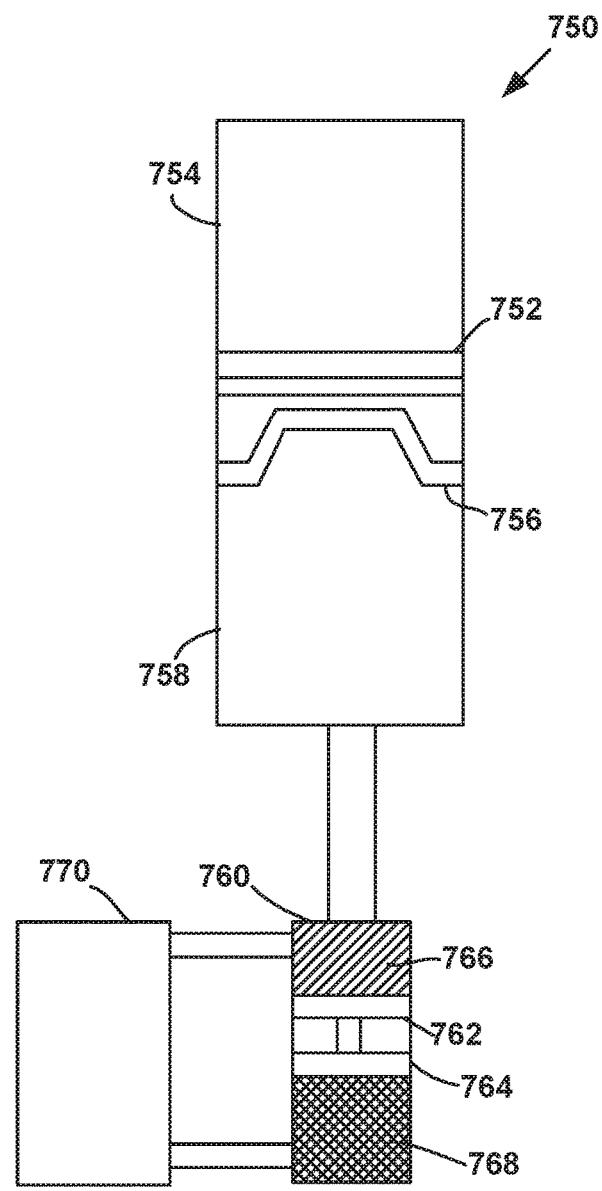

Another embodiment of part of a latchable, asymmetric splitter unit 750, that uses microfluidic technology, is schematically illustrated in FIGS. 7C and 7D. The splitter unit 750 includes a first waveguide 752 mounted on a substrate 754 and a second waveguide 756 mounted on a movable substrate 758. The movable substrate 758 is movable in a direction transverse to the waveguides 752, 756. The movable substrate 758 is connected to a hydraulic element 760 that includes a piston 762 within a cylinder 764. The piston 762 is movable within the cylinder 764 to change the first volume 766, single-hatched, on one side of the piston 762, and the second volume 768, cross-hatched, on the other side of the piston. A microfluidic management system 770 is connected to the hydraulic element 760 to control the amount of hydraulic fluid in the first volume 766 and the second volume 768, and thus control the position of the second waveguide 756 relative to the first waveguide 752. Optical fibers, not shown, may be attached to the first and second waveguides 702, 706. In the embodiment illustrated in FIG. 7C, the gap between the waveguides 752, 756 is large, corresponding to reduced coupling between the waveguides 752, 756. In the embodiment illustrated in FIG. 7D, the gap between the waveguides 752, 756 is reduced, corresponding to increased coupling between the waveguides 752, 756.

Figure 8A:
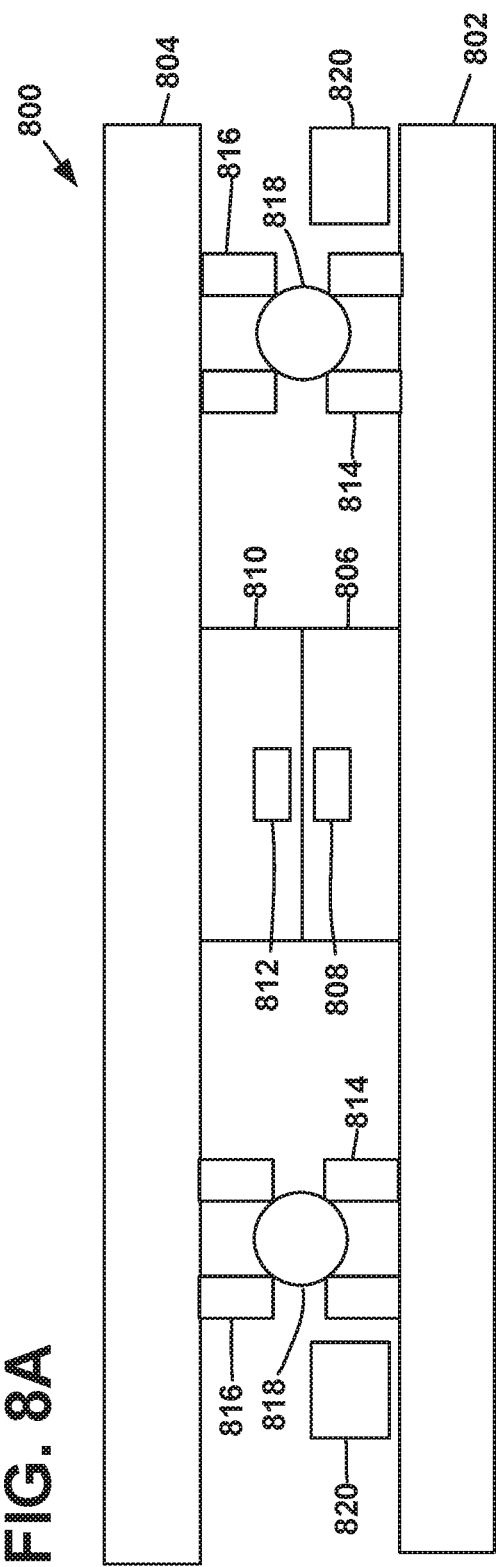
FIGS. 8A and 8B schematically illustrate an embodiment of a latchable asymmetric adjustable waveguide splitter having a lockable translation mechanism, according to an embodiment of the present invention.
Figure 8B:
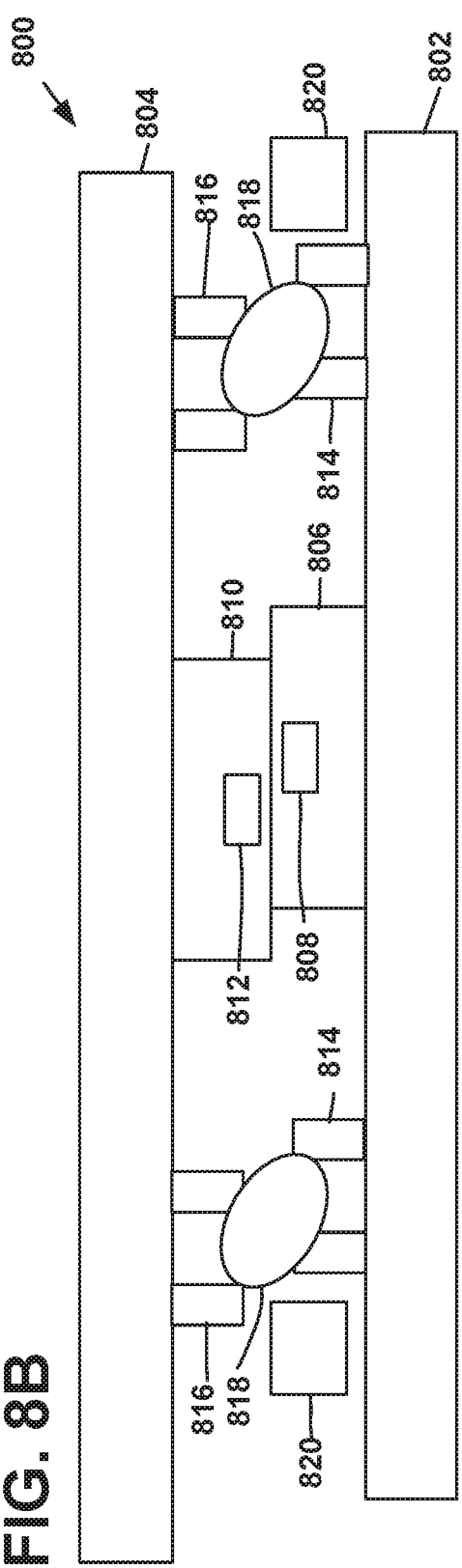

Another embodiment of part of a latchable, asymmetrical splitter unit 800 is schematically illustrated in FIGS. 8A and 8B. The splitter unit 800 includes a lower substrate 802 and an upper substrate 804. The lower substrate 802 is provided with at least a first waveguide cladding 806 which is cladding to a first waveguide 808. In some embodiments, the first waveguide cladding 806 and first waveguide 808 maybe formed on the first substrate 802 directly, using planar lithographic technology. In other embodiments, the first waveguide cladding 806 and first waveguide 808 may be formed on a preliminary substrate (not shown) that is subsequently attached to the first substrate 802. As with other embodiments of latchable, asymmetrical splitter units discussed herein, the waveguide 808 may be based on any suitable optical material including, but not limited to, silicon, silicon nitride and silicon dioxide.

The second substrate 804 is provided with a second waveguide cladding 810 and second waveguide 812. Like the first waveguide cladding 806 and first waveguide 808, the second waveguide cladding 810 and second waveguide 812 maybe formed on the second substrate 804 directly using planar lithographic technology, or may be first formed substrate 804. The second substrate 804 is horizontally translatable relative to the first substrate 802 via a MEMS translating actuator (not shown).

The first and second substrates 802, 804 are provided with respective solder supports 814, 816. Portions of solder 818 are located between the solder supports 814, 816. Heating elements 820 are provided close to the solder supports 814, 816. The heating elements 820 may formed of any suitable type of element that provides localized heating, such as resistive wires. The heating elements 820 may be provided on, or close to, the solder supports 814, 816.

The heating elements 820 can be activated so as to melt the solder portions 818 when actuation of the asymmetrical splitter unit 800 is desired. Once the solder portions 818 have been melted, the MEMS translating actuator can move the second substrate 804 relative to the first substrate 802 by an amount that selects a desired fraction of optical power to be tapped from the main line. Once the unit 800 is operating with the desired tap fraction, as set by a relative displacement between the two waveguides 808, 812, the heating elements 820 can be deactivated. This allows the solder portions 818 to solidify, thus fixing the second substrate's position relative to the first substrate 802, which latches the tap fraction at the desired value. FIG. 8A shows a configuration where the second waveguide 812 is positioned above the first waveguide 808, which corresponds with a relatively large level of optical coupling between the two waveguides 808, 812. FIG. 8B shows a configuration where the second waveguide 812 has been laterally translated from the vertical position of FIG. 8A, so that there is a lower level of optical coupling between the waveguides 808, 812.

Another embodiment of part of a latchable, asymmetrical splitter unit 900 is schematically illustrated in FIGS. 9A and 9B. The unit 900 has a substrate 902 that is provided with a step 904. On top of the step 904 is a first waveguide 906 in a first waveguide cladding 908. In some embodiments, the first waveguide cladding 908 and the first waveguide 906 maybe formed on the substrate 902 directly, using planar lithographic technology.

Beside the step 904 is a cantilevered portion 910 that includes a second waveguide 912 in a second waveguide cladding 914 on a cantilever 916. The cantilever 916 is attached at one end to a cantilever support 918. The cantilever 916 is a MEMS-activatable via application of an electric field to displace downwards. In a first position, as shown in FIG. 9A, the second waveguide 912 is level with the first waveguide 906. In a second the first waveguide 906, resulting in reduced optical coupling between the waveguides 906, 912 than in the configuration shown in FIG. 9A. Portions of solder 920 below the cantilever 916 provide support and can have their height changed by melting the solder 920 before activation of the cantilever 916.

Figure 10:
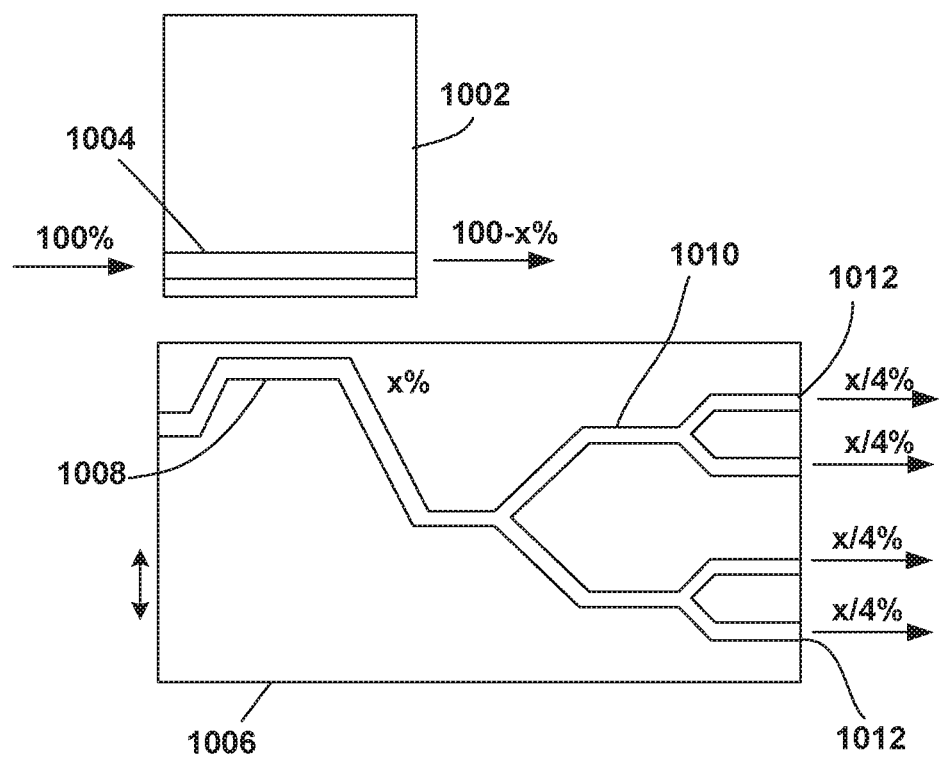
FIG. 10 schematically illustrates an embodiment of a latchable asymmetric adjustable waveguide splitter having a splitter network, according to an embodiment of the present invention.

In some embodiments, the optical signal coupled into the tap waveguide may be sent directly into an optical fiber for transmission. In other embodiments, the tap waveguide may serve as an input to a waveguide splitter network, with the tapped optical signal being split into parts that are directed to individual optical fibers. One embodiment of such an approach is schematically illustrated in FIG. 10. A first substrate 1002 includes a first waveguide 1004 that receives the full optical signal (100%). A second substrate 1006 includes a tap waveguide 1008 that receives a fraction, x %, of the optical signal. Thus, the output from the first waveguide 1004 is (100-x) % of the input signal. The value of x is selected for the specific application by adjusting the relative positions of the first waveguide 1004 and the tap waveguide 1008, as discussed above.

The tap waveguide 1008 is coupled to a splitter network 1010, having a number of outputs 1012. In the illustrated embodiment, the splitter network 1010 splits the input signal into four signals of equal magnitude, and so the optical signal at each output 1012 is x/4%. It will be appreciated that the splitter network 1010 may include a different number of outputs 1012, for example 2, 8 or 16 outputs, and that the fraction of light sent to different outputs 1012 need not be the same for all outputs 1012.

EXAMPLE

Figure 11:
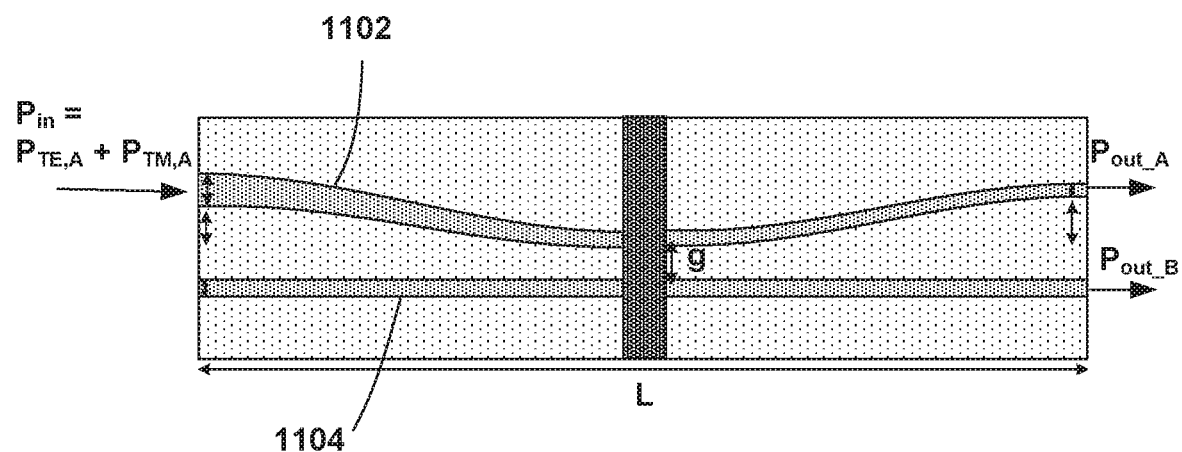
FIG. 11 schematically illustrates a model coupler employed in analysis of a latchable asymmetric adjustable waveguide splitter.

The optical coupling between two waveguides has been numerically modeled. The waveguide structure assumed for the analysis is as shown in FIG. 11. The coupler has a length of L=3 cm. The height of the waveguides was assumed to be 7 µm. In this analysis, the tap waveguide 1104 was assumed to have a width that was constant along its length, 2 µm. The width of the main waveguide 1102 varied along the length of the coupler, from a maximum at the left (input end) $Wm_{max}$=6.5 µm, to $Wm_{mid}$=3 µm at the mid-point where the waveguide separation was least, to a minimum value of $Wm_{min}$=2.5 µm at the right (output end).

The minimum center-to-center spacing between the two waveguides 1102, 1104, denoted as "g," was measured at the center of the coupler. The material assumed for the cladding was fused silica, having a refractive index of 1.444 at 1550 nm. It was assumed doped silica having a refractive index of about 1.451 at 1550 nm.

FIGS. 12A-18B present results of the analysis for various values of the minimum center-to-center spacing, g. Two data plots are presented for each value of "g." The figures denoted "A" (e.g. FIGS. 12A, 13A etc.) present the transmission through the coupler at each output, shown in dB, as a function of wavelength, over the range of about 1.3 µm to about 1.6 µm. Each plot shows two curves—each curve labeled "A" represents the output from the main waveguide, while each curve labeled "B" represents the output from the tap waveguide. The power was calculated for an even split of the optical power into the TE mode and the TM mode. The figures denoted "B" (e.g. FIGS. 12B, 13B, etc.) present a plot of optical power within the coupler in the TEA mode, at 1460 nm.

Figure 12A:
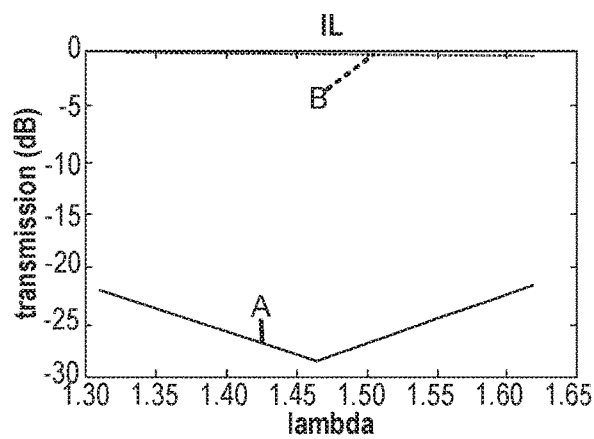
FIGS. 12A and 12B respectively present results of splitter transmission as a function of wavelength and power flow in the coupler, for a gap size of 6 μm.
Figure 12B:
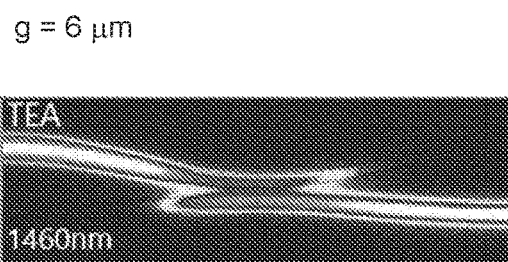

FIG. 12A shows the power transmission as a function of wavelength when the gap, g,=6 µm. Virtually all of the light is coupled from the main waveguide 1102 to the tap waveguide—the curve "B," which represents the power out of the tap waveguide 1104, is flat with a value of almost zero dB across the wavelength range. Curve "A," which represents the power out of the main waveguide 1102, is less than 21 dB across the entire wavelength range. This is confirmed in the power plot of FIG. 12B, which shows virtually all the optical power in the tap waveguide.

Figure 13A:
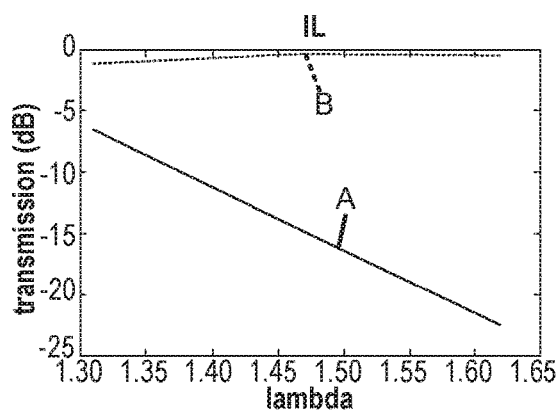
FIGS. 13A and 13B respectively present results of splitter transmission as a function of wavelength and power flow in the coupler, for a gap size of 8 μm.
Figure 13B:
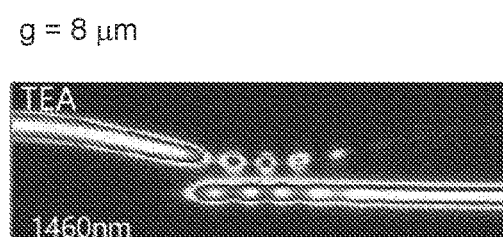
Figure 14A:
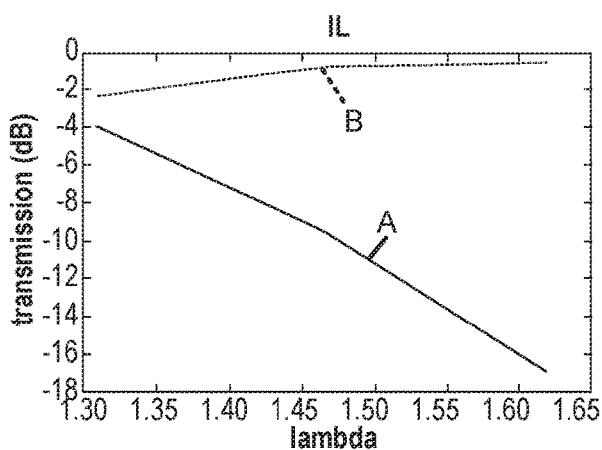
FIGS. 14A and 14B respectively present results of splitter transmission as a function of wavelength and power flow in the coupler, for a gap size of 9 μm.
Figure 14B:
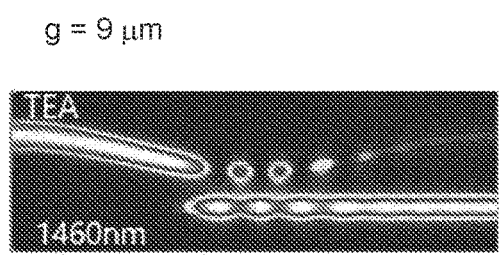
Figure 15A:
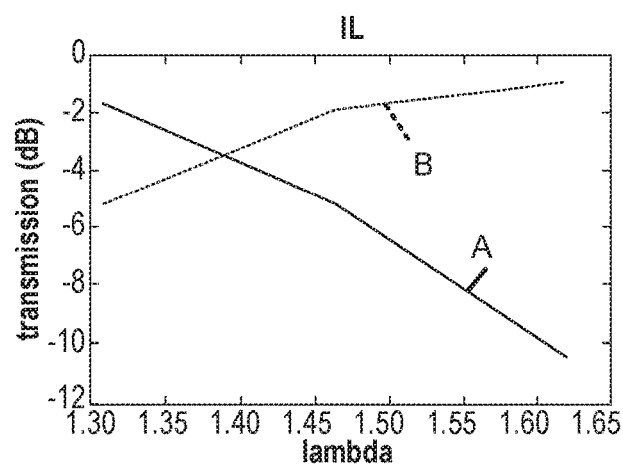
FIGS. 15A and 15B respectively present results of splitter transmission as a function of wavelength and power flow in the coupler, for a gap size of 10 μm.
Figure 15B:
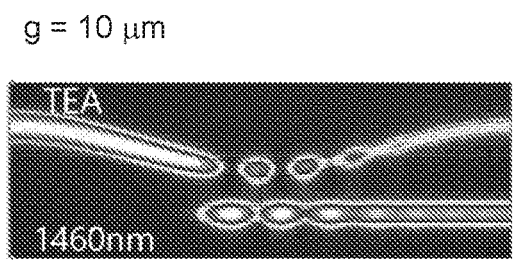
Figure 16A:
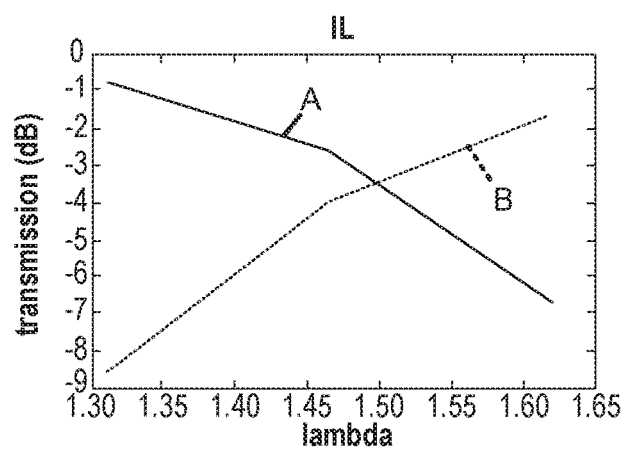
FIGS. 16A and 16B respectively present results of splitter transmission as a function of wavelength and power flow in the coupler, for a gap size of 11 μm.
Figure 16B:
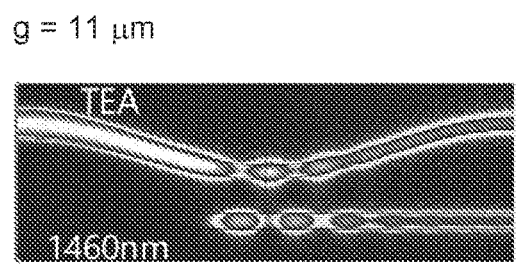
Figure 17A:
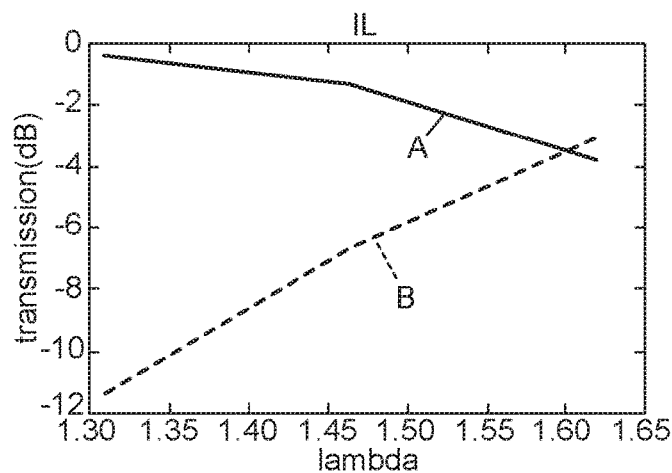
FIGS. 17A and 17B respectively present results of splitter transmission as a function of wavelength and power flow in the coupler, for a gap size of 12 μm.
Figure 17B:
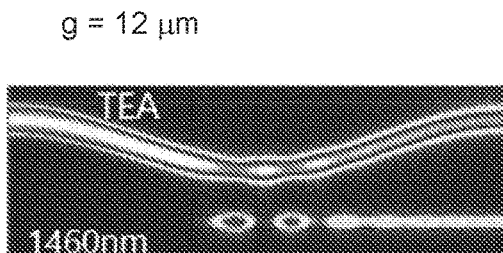
Figure 18A:
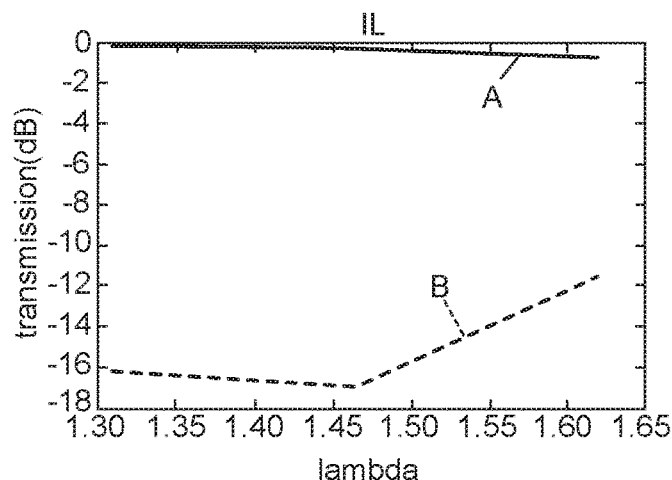
FIGS. 18A and 18B respectively present results of splitter transmission as a function of wavelength and power flow in the coupler, for a gap size of 16 μm.
Figure 18B:
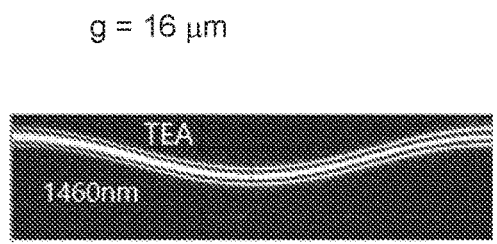

FIGS. 13A and 13B to FIGS. 18A and 18B show similar data but for different values of "g". FIGS. 13A and 13B show data for "g"=8 µm. FIGS. 14A and 14B show data for "g"=9 µm. FIGS. 15A and 15B show data for "g"=10 µm. FIGS. 16A and 16B show data for "g"=11 µm. FIGS. 17A and 17B show data for "g"=12 µm. FIGS. 18A and 18B show data for "g"=16 µm.

Figure 19:
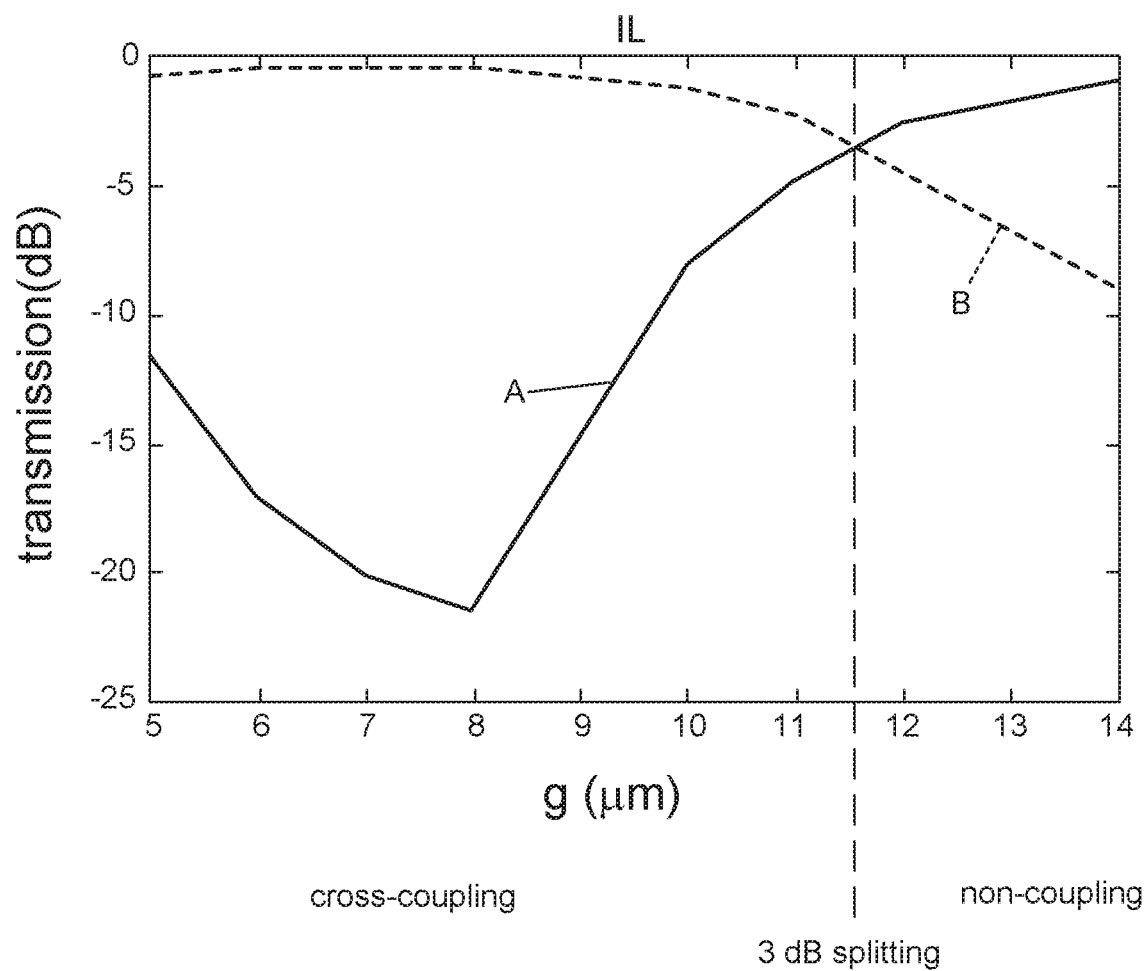
FIG. 19 presents results of splitter transmission as a function of gap size for a wavelength of 1550 nm.

In general, as the value of "g" is increased, the degree of coupling from the main waveguide to the tap waveguide reduces. This behavior is wavelength dependent. This is illustrated in FIG. 19 which shows a plot of transmission at 1550 nm as a function of "g." The 3 dB splitting point is at around g=11.5 µm, below which there is cross-coupling, i.e. more light is coupled to the tap waveguide than remains in the main waveguide, and above which there is little or no coupling. The value of "g" at which the 3 dB crossing is achieved is wavelength dependent. The 3 dB crossing occurs at a wavelength of about 1.38 µm when "g"=10 µm, see FIG. 15A, and at a wavelength of about 1.6 µm when "g" is 12 µm.

The level of coupling from the main waveguide to the tap waveguide changes almost 100% with "g" varying over about 10 µm. Accordingly, the range of motion for values that would be used in a latchable, asymmetric coupler.

Various modifications, equivalent processes, as well as numerous structures to which the present invention may be applicable will be readily apparent to those of skill in the art to which the present invention is directed upon review of the present specification. The claims are intended to cover such modifications and devices.

As noted above, the present invention is applicable to fiber optical communication and data transmission systems. Accordingly, the present invention should not be considered limited to the particular examples described above, but rather should be understood to cover all aspects of the invention as fairly set out in the attached claims.

What we claim as the invention is:

1. An optical system, comprising:
a laser transmitter system to generate an optical signal;
a first optical fiber network coupled to transmit the optical signal from the laser transmitter system;
a first latchable, asymmetric coupler disposed along the first optical fiber network to receive the optical signal, the first latchable, asymmetric coupler being configured and arranged with a first tap output that receives a selected and alterable first fraction of the optical signal incident at the first latchable, asymmetric coupler, the first latchable asymmetric coupler comprising a main optical waveguide, a tap waveguide, and a mechanism capable of changing a position of the tap waveguide relative to the main optical waveguide, thereby affecting an amount of optical coupling between the main optical waveguide and the tap waveguide; and
a second latchable, asymmetric coupler disposed along the first optical fiber network to receive the optical signal from the first latchable asymmetric coupler, the second latchable, asymmetric coupler being configured and arranged with a second tap output that receives a selected and alterable second fraction of the optical signal incident at the second latchable, asymmetric coupler, the second fraction being different from the first fraction.

2. The optical system as recited in claim 1, wherein the first, latchable asymmetric coupler comprises the main optical waveguide in a first substrate, the tap waveguide in a tap cladding, and the mechanism attached to the tap cladding, the mechanism being capable of holding the tap waveguide in a fixed spatial relationship relative to the main optical waveguide, thereby maintaining a selected level of optical coupling between the main optical waveguide and the tap waveguide.

3. The optical system as recited in claim 1, wherein the mechanism is capable of changing the position of the tap waveguide relative to the main optical waveguide in a direction substantially parallel to a direction of optical coupling between the main optical waveguide and the tap waveguide.

4. The optical system as recited in claim 1, wherein the mechanism is capable of changing the position of the tap waveguide relative to the main optical waveguide in a direction substantially perpendicular to a direction of optical coupling between the main optical waveguide and the tap waveguide.

5. The optical system as recited in claim 1, wherein the mechanism is capable of translating the tap waveguide in a direction substantially parallel to a longitudinal axis of the tap waveguide.

6. The optical system as recited in claim 1, wherein the mechanism comprises a ratchet element for maintaining a fixed position of the tap waveguide relative to the main optical waveguide.

7. The optical system as recited in claim 1, wherein the mechanism comprises one or more heater elements and one or more portions of solder.

8. The optical system as recited in claim 1, wherein the mechanism comprises a cantilever.

9. The optical system as recited in claim 8, wherein the mechanism further comprises one or more portions of solder.

10. The optical system as recited in claim 1, wherein the tap waveguide is on a tap substrate, the tap substrate also including a splitter network coupled to the tap waveguide.

11. An optical system, comprising:
a laser transmitter system to generate an optical signal;
a first optical fiber network coupled to transmit the optical signal from the laser transmitter system;
a first latchable, asymmetric coupler disposed along the first optical fiber network to receive the optical signal, the first latchable, asymmetric coupler capable of operating at any of at least three different tapping fractions, the first latchable asymmetric coupler comprising a main optical waveguide, a tap waveguide, and a mechanism capable of changing a position of the tap waveguide relative to the main optical waveguide to select one of the at least three tapping fractions; and a second latchable, asymmetric coupler disposed along the first optical fiber network to receive the optical signal from the first latchable asymmetric coupler, the second latchable, asymmetric coupler being capable of operating at any of at least three different tapping fractions.

12. The optical system as recited in claim 11, wherein the first, latchable asymmetric coupler comprises the main optical waveguide in a first substrate, the tap waveguide in a tap cladding, and the mechanism attached to the tap cladding, the mechanism being capable of holding the tap waveguide in a fixed spatial relationship relative to the main waveguide, thereby maintaining a selected tapping fraction.

13. The optical system as recited in claim 11, wherein the mechanism is capable of changing the position of the tap waveguide relative to the main optical waveguide in a direction substantially parallel to a direction of optical coupling between the main optical waveguide and the tap waveguide.

14. The optical system as recited in claim 11, wherein the mechanism is capable of moving the tap waveguide in a direction substantially perpendicular to a direction of optical coupling between the main optical waveguide and the tap waveguide.

15. The optical system as recited in claim 11, wherein the mechanism is capable of translating the tap waveguide in a direction substantially parallel to a longitudinal axis of the tap waveguide.

16. The optical system as recited in claim 11, wherein the mechanism comprises a ratchet element for maintaining a fixed position of the tap waveguide relative to the main optical waveguide.

17. The optical system as recited in claim 11, wherein the mechanism comprises one or more heater elements and one or more portions of solder.

18. The optical system as recited in claim 11, wherein the mechanism comprises a cantilever.

19. The optical system as recited in claim 18, wherein the mechanism further comprises one or more portions of solder.

20. The optical system as recited in claim 11, wherein the tap waveguide is on a tap substrate, the tap substrate also including a splitter network coupled to the tap waveguide.

\* \* \* \* \*